United States Patent [19]
Engel et al.

[11] Patent Number: 5,259,203
[45] Date of Patent: Nov. 9, 1993

[54] APPARATUS AND METHOD FOR EXTRACTING POTABLE WATER FROM ATMOSPHERE

[76] Inventors: Daniel R. Engel, 1015 Green Meadow, Beaumont, Tex. 77706; Matthew E. Clasby, Jr., 1816 W. Maple, Orange, Tex. 77630

[21] Appl. No.: 883,415

[22] Filed: May 14, 1992

[51] Int. Cl.⁵ .............................................. F25D 21/14
[52] U.S. Cl. ........................................ 62/150; 62/291
[58] Field of Search ................. 62/291, 288, 285, 150, 62/272

[56] References Cited

U.S. PATENT DOCUMENTS

| | | | |
|---|---|---|---|
| 2,090,413 | 8/1937 | Gould | 62/150 |
| 2,956,417 | 10/1960 | Lyman | 62/291 X |
| 3,035,418 | 5/1962 | Wright | 62/291 X |
| 3,496,731 | 2/1970 | Sholtes | 62/291 X |
| 3,675,442 | 7/1972 | Swanson | 62/272 X |
| 4,255,937 | 3/1981 | Ehrlich | 62/291 X |
| 4,712,382 | 12/1987 | LeClear | 62/291 X |
| 4,742,691 | 5/1988 | Kennedy | 62/150 X |

*Primary Examiner*—William E. Tapolcai
*Attorney, Agent, or Firm*—Kenneth A. Roddy

[57] ABSTRACT

Apparatus and method for extracting potable drinking water from moisture-laden atmospheric air through the use of a refrigeration system. A compact housing contains a compressor, an evaporator unit, fan unit, condenser unit, and a reservoir which may contain a secondary evaporator unit and condenser unit. The fan pulls a stream of atmospheric air through a filter and through the evaporator to clean and cool the air and exhausts cooled air through the condenser. The water is collected as condensation by the evaporator and directed to the reservoir through a filter system and a water seal. The reservoir may have separate compartments for holding cool or warm water. The secondary evaporator is submersed in the cool water compartment for cooling the water collected in the reservoir and the secondary condenser is submersed in the warm water compartment for heating the collected water. Operation of the system is controlled by a control module which may also contain a microprocessor for assuring maximum condensation and a removable I.C. program module to alter the operation for specific conditions. A humidistat may also be provided to maximize efficiency of atmospheric condensation throughout various times of day or night and in various climates.

19 Claims, 3 Drawing Sheets

APPARATUS AND METHOD FOR EXTRACTING POTABLE WATER FROM ATMOSPHERE

BACKGROUND OF THE INVENTION

1. Field of the Invention

This invention relates generally to the creation of potable water, an more particularly to an apparatus and method for extracting potable drinking water from moisture-laden atmospheric air at atmospheric temperature through the use of a refrigeration system.

2. Brief Description of the Prior Art

This invention relates to apparatus and method for specifically and effectively extracting and condensing potable water in the form of water vapor which is contained in atmospheric air for human consumption and like purposes.

Potable water is scarce or non-existent in many areas of the earth and there have been many attempts to provide potable water for drinking and such like purposes, however, past techniques proved to be very expensive or inefficient.

There are several patents which disclose various apparatus and methods for extracting potable water from the atmosphere.

Gerard et al, U.S. Pat. No. 3,498,077 discloses an apparatus and method for extracting moisture from the atmosphere which is suitable for use in seashore or island area. Cold sea water is pumped to condensers on shore which intercept the high humidity maritime air masses. The apparatus is powered by water driven turbines or windmills.

Swanson U.S. Pat. No. 3,675,442 discloses an atmospheric water collector which employs cooling coil immersed in a fresh water bath which cools the bath (not the drinking water). The cooled water is pumped through a conduit and condensing frame. Moisture is condensed from winds at ambient temperature passing over the condensing frame and drains into a collector. If the condensed water is below a predetermined temperature it is mixed with the fresh water bath. Thus, the water being used as the refrigerant is periodically mixed with the condensed water subjecting it to contamination and making the consumption of the water questionable.

Nasser et al, U.S. Pat. No. 4,182,132 discloses a device requiring two fans and two air chambers for operation, and suggests mounting the device on a post and above the tallest building. The two fans operate in tandem to reverse the air flow to be drawn through the evaporator and they cannot exhaust the cooled air through the evaporator due to their intake opening. This causes air of ambient temperature to be drawn into and through the condenser resulting in the loss of efficiency and condensation. Because the air is pushed through the evaporator it will cause partial drying of the newly formed condensation and result in loss of condensation and reduced output and efficiency. The present invention, on the other hand, pulls the air stream through the evaporator, and exhausts the residing air which has had the temperature reduced, through the condenser, thereby increasing efficiency and increasing condensation.

Courneya, U.S. Pat. No. 4,351,651 discloses an apparatus and method for extracting potable water from air at atmospheric temperature through the use of a heat exchanger which is which buried under ground or placed beneath the sea to produce a temperature at or near subsurface temperature and directing moisture-laden air from the surface through the cold heat exchanger.

Smith, U.S. Pat. No. 4,433,552 discloses a wind powered apparatus and method for recovering atmospheric moisture utilizing a wind driven electrical generator mounted within an air duct housing for powering a refrigeration system having an evaporator positioned in the duct for condensing moisture, a condenser, a coolant canister positioned in the duct and including an endothermic material therein for removing heat from the airstream causing condensation on the coolant canister.

The present invention is distinguished over the prior art in general, and these patents in particular by an apparatus and method for extracting potable drinking water from moisture-laden atmospheric air through the use of a refrigeration system. A compact housing contains a compressor, an evaporator unit, fan unit, condenser unit, and a reservoir which may contain a secondary evaporator unit and condenser unit. The fan pulls a stream of atmospheric air through a filter and through the evaporator to clean and cool the air and exhausts cooled air through the condenser. The water is collected as condensation by the evaporator and directed to the reservoir through a filter system and a water seal. The reservoir may have separate compartments for holding cool or warm water. The secondary evaporator is submersed in the cool water compartment for cooling the water collected in the reservoir and the secondary condenser is submersed in the warm water compartment for heating the collected water. Operation of the system is controlled by a control module which may also contain a microprocessor for assuring maximum condensation and a removable I.C. program module to alter the operation for specific conditions. A humidistat may also be provided to maximize efficiency of atmospheric condensation throughout various times of day or night and in various climates.

SUMMARY OF THE INVENTION

It is therefore an object of the present invention to provide an apparatus and method for obtaining potable water.

It is another object of this invention to provide an apparatus and method for extraction of potable water from atmospheric air.

Another object of this invention is to provide an apparatus and method for heating or cooling potable water collected from the atmosphere.

Another object of this invention is to provide an apparatus and method for extracting potable water from atmospheric air which may be operated by computer control and may use removable and interchangeable program modules.

A further object of this invention is to provide an apparatus and method for extracting potable water from atmospheric air wherein the extraction means also serves as the means of heating and cooling the potable water.

A still further object of this invention is to provide a an apparatus for extracting potable water from atmospheric air which is simple in construction, economical to manufacture, and rugged and reliable in operation.

Other objects of the invention will become apparent from time to time throughout the specification and claims as hereinafter related.

The above noted objects and other objects of the invention are accomplished by the present apparatus and method for extracting potable drinking water from moisture-laden atmospheric air through the use of a refrigeration system. A compact housing contains a compressor, an evaporator unit, fan unit, condenser unit, and a reservoir which may contain a secondary evaporator unit and condenser unit. The fan pulls a stream of atmospheric air through a filter and through the evaporator to clean and cool the air and exhausts cooled air through the condenser. The water is collected as condensation by the evaporator and directed to the reservoir through a filter system and a water seal. The reservoir may have separate compartments for holding cool or warm water. The secondary evaporator is submersed in the cool water compartment for cooling the water collected in the reservoir and the secondary condenser is submersed in the warm water compartment for heating the collected water. Operation of the system is controlled by a control module which may also contain a microprocessor for assuring maximum condensation and a removable I.C. program module to alter the operation for specific conditions. A humidistat may also be provided to maximize efficiency of atmospheric condensation throughout various times of day or night and in various climates.

DESCRIPTION OF THE PREFERRED EMBODIMENT

In the embodiment illustrated the refrigeration system is shown having single evaporator and condenser units and a dual compartment reservoir, however, it should be understood that the system may incorporate plural elements. It should also be understood that the physical location of the parts may be varied and mounted in other stationary or mobile medium, such as a portable water cooler as described hereinafter with reference to FIG. 2.

Figure 1:
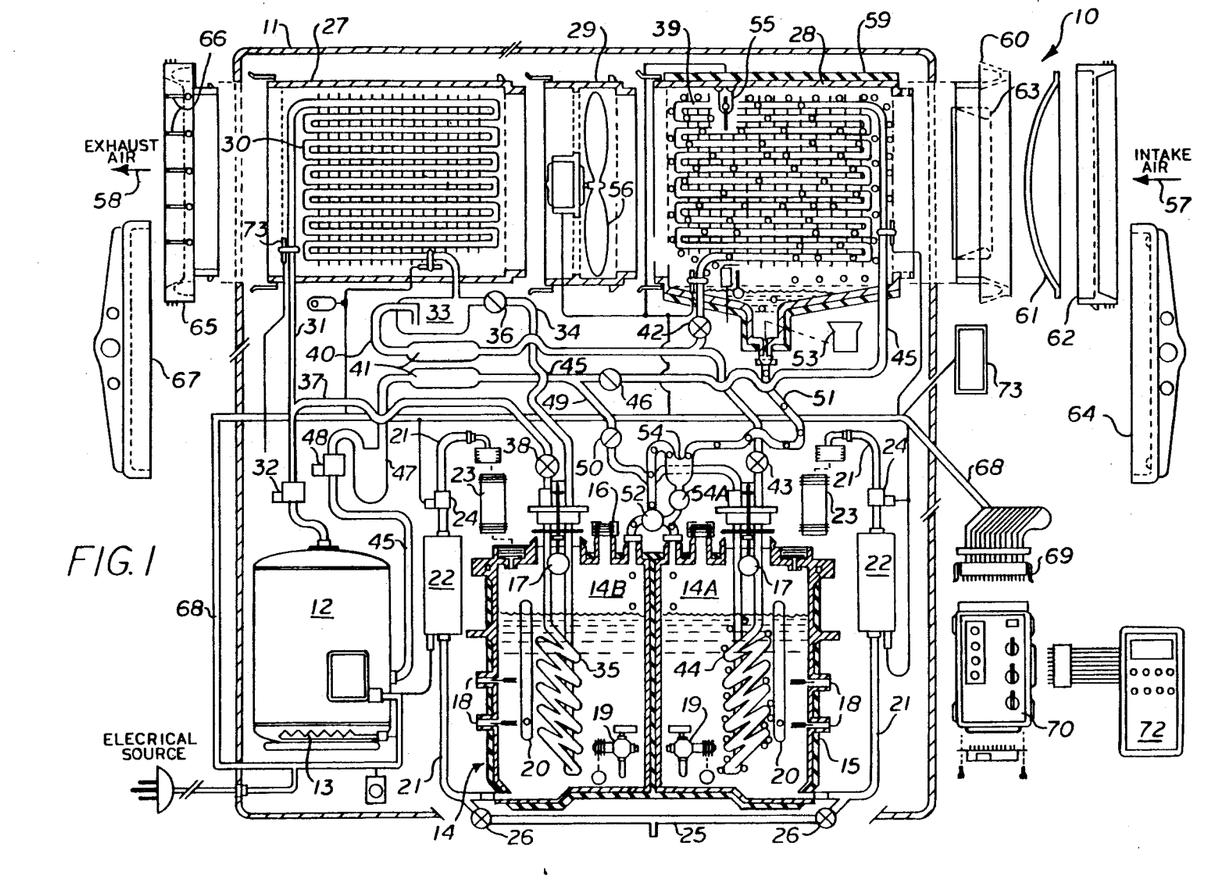
FIG. 1 is a cross sectional view showing diagrammatically an apparatus for extracting potable water from the atmosphere in accordance with the present invention.

Referring now to FIG. 1 of the drawings, there is shown in FIG. 1, a preferred water extraction apparatus 10. A refrigeration system operated by a compressor 12 is contained within a compact rigid housing 11 which may be mounted within a window or on a wall. The compressor 12 is preferably powered by a motor provided with a temperature controlled crankcase 13 which may be of the internal heat exchanging tube type, resistance heater, or other conventional temperature control means. In some applications, the compressor 12 may be powered by a power take-off.

A sanitary water reservoir 14 is contained within the housing 11 and, in the illustrated embodiment, is divided into a cold water compartment 14A and a warm water compartment 14B which may be insulated as shown at 15. The reservoir 14 may also be a single compartment or comprise a plurality of holding compartments. The reservoir 14 may also contain access openings 16 with removable caps. A water level sensing device 17, such as a float type, monitors the level of the collected water in each compartment, and the water may also be monitored by temperature sensors 18. Each reservoir compartment is provided with dispensing valves 19 for removing the water, or the reservoir compartments may be removable in which case water may be simply poured from the compartments. The reservoir water level can be observed by means of a sight glass 20, or other suitable indicator device on each compartment.

Conduit 21 extends from the bottom of each reservoir compartments, through a circulating pump 22 and a replaceable filter 23 and returns to the reservoir compartments. A pressure sensing device 24 is located in the conduit 21 at a location where the water stream will increase the circulating pressure upon a resistance in the water filter 23 and turn off the circulating pump 22 to prevent overload or damage. Conduit 25 is connected is between the lower ends of conduit 21 near the reservoir outlets and is provided with drain valves 26.

Duct sections 27, 28, and 29 are contained within the housing 11 for conducting atmospheric air through the housing. Duct section 27 contains a condenser unit 30 connected at its intake side by conduit 31 to the compressor 12 through a pressure sensing device 32. The outlet side of the condenser unit 30 is connected to a receiver 33 and by conduit 34 to the intake of a secondary condenser unit 35 which is disposed within the warm water compartment 14B of the reservoir 14. A check valve 36 is installed in conduit 34 between the receiver 33 and secondary condenser unit 35. The outlet of the secondary condenser unit 35 is connected by conduit 37 back into the conduit 31 between the compressor 12 and the condenser unit 30. A solenoid valve 38 is installed in the conduit 37 between the secondary condenser unit 35 and the conduit 31.

Duct section 28 contains an evaporator unit 39. A conduit 40 extends from the receiver 33 through a filter or dryer 41 and diverges through an expansion valve 42 to the intake of the evaporator unit 39 and through an expansion valve 43 to a secondary evaporator 44 within the cold water compartment 14A of the reservoir 14. The outlet side of the evaporator unit 39 is connected by conduit 45 which extends to the return side of the compressor 12 through a check valve 46, a filter or dryer 41, an accumulator 47 and a pressure sensing device 48. The outlet side of the secondary evaporator 44 is joined by conduit 49 through a check valve 50 to the conduit 45 between the check valve 50 and the dryer 41.

The bottom portion of the duct section 28 is tapered to collect condensation and is connected to the reservoir 14 by conduit 51 which extends downwardly and diverges through a directional valve 52 to be directed either into the cold water compartment 14A or warm water compartment 14B of the reservoir 14. A replaceable filter 53 is installed at the tapered bottom portion of the duct section 28 to filter the condensation. The filter 53 may be a "snap-in" type and changed by removing an access door on the duct or housing.

A water seal 54, or other suitable device, is installed in the conduit 51 and connected through a drain valve 54A to the directional valve 52 to aid in isolating incoming environmental elements and the ambient air temperature from the reservoir 14. The water seal 54 may also be temperature controlled to extract or inject heat from or into the internal water content of the seal to provide a more consistent temperature in the reservoir. An air flow sensing device 55, which may be of a flag switch type, may be located within the duct section 28.

Duct section 29 is disposed between duct sections 27 and 28 and contains a motorized blower or fan 56. As explained hereinafter, the fan 56 draws ambient air, represented by arrow 57 from the atmosphere through the duct 28 and the outgoing air, represented by arrow 58 is exhausted through the duct 27. The duct element 28 may be insulated as represented at 59 so as to minimize the exchanging of temperature between the duct section and the incoming atmospheric air stream 57, in addition to minimizing the exchange of the temperature between the duct section and the evaporator unit 39.

An air intake ring 60 is mounted at the intake end of the duct 28 and receives a replaceable air filter 61 which is maintained thereon by a retainer ring 62. An air intake stabilizer 63 may optionally be located within the air intake ring 60 to enhance efficiency. The air intake stabilizer 63 is configured to aerodynamically pass the incoming atmospheric air stream 57 through the duct sections and provide a stable air flow rate. The air filter 61 is constructed of a suitable non-absorbent material to trap particles of dirt and/or other undesirable elements. An optional removable cap or cover 64 may be used to cover the filter 61 in hostile conditions or environments.

An exhaust ring 65 is mounted at the discharge end of the duct 27 and preferably has a plurality of lightweight louvers or shutters 66 pivotally mounted thereon which may be closed by gravity or other means conventional in the art. The shutters 66 help to keep out undesirable environmental elements when the system is in a non-operating state. An optional removable cap or cover 67 may be used to cover the exhaust opening in hostile conditions or environments.

The system is powered by an electrical source and electrical current is supplied to the components by a wiring harness 68 having a plurality of electrical conductors and modular plug connectors 69 for fast economical assembly and repair.

The operation of the system is controlled by a control module 70 which may contain switches and buttons necessary for operation of the system. Control module 70 may also contain a microprocessor for assuring maximum condensation, in addition to a removable program module 71, or pre-programmed I.C. chip, which may be plugged into the control module to alter operation for specific conditions. The control module 70, may also contain an auxiliary power supply battery for retaining information in the event of electrical failure. The insertable program module 71 provides maximum operation for a specific geographical location and allows the system to immediately adapt to new environmental conditions when necessary. A diagnostic test unit 72 may be provided which will plug into the control module 70 for trouble-shooting and repair of the system.

A humidistat 73 may be provided to maximize efficiency of atmospheric condensation throughout various times of day or night while in a manual or an automatic operating state. The humidistat 73 is monitored by the control module microprocessor and referenced with program module 71. This feature enhances water collection in desert climates, under varied conditions.

ANOTHER EMBODIMENT

Figure 2:
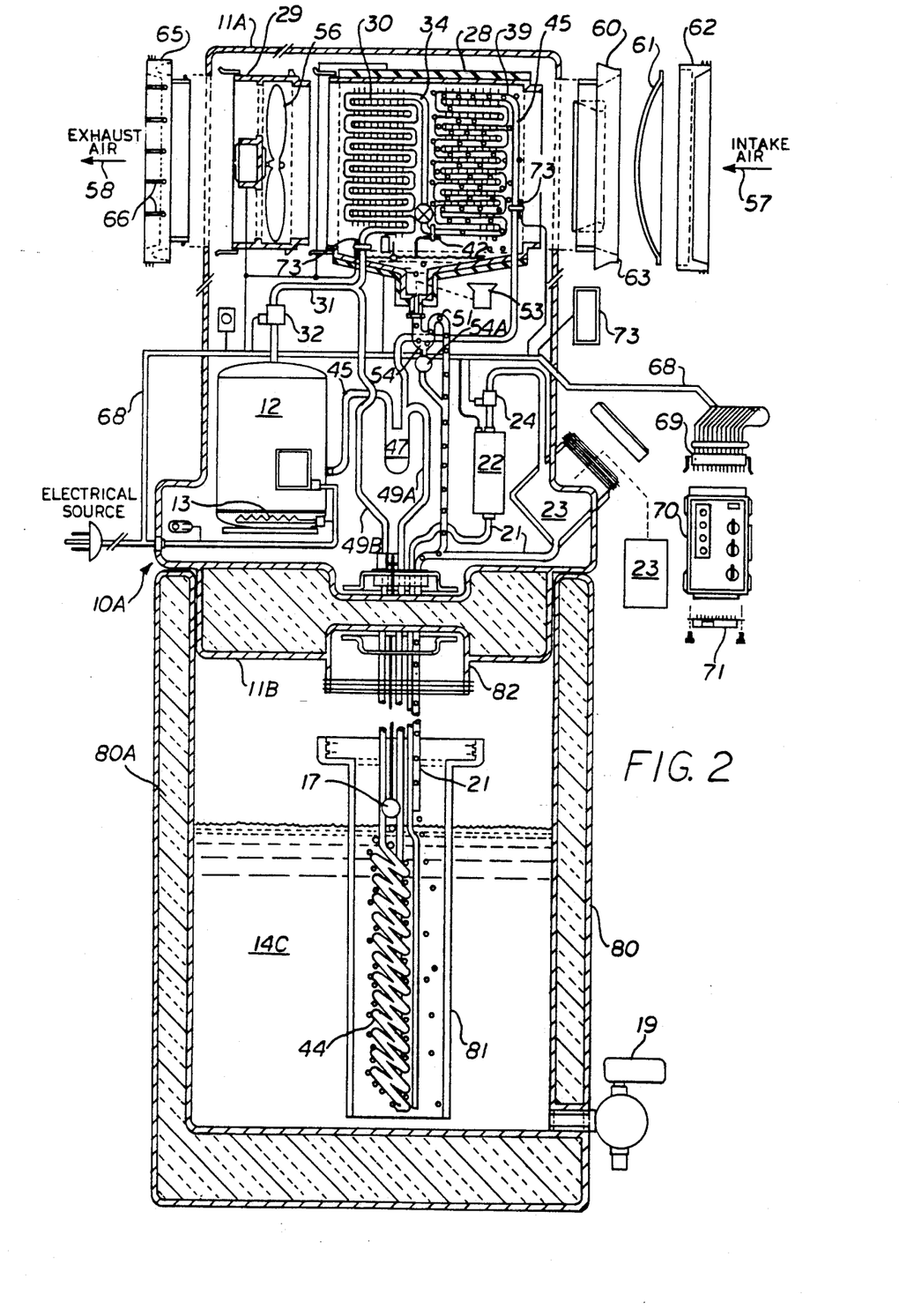
FIG. 2 is a cross sectional view showing diagrammatically a portable embodiment of the apparatus for extracting potable water from the atmosphere in accordance with the present invention.

An alternate embodiment of the water extraction system 10A is illustrated in FIG. 2 which has an upper housing which is removably received and installed on a lower reservoir. Many of the components previously described with reference to FIG. 1 are given the same numerals of reference, however, the description of all the same components will not be repeated, to avoid repetition.

As previously described, a refrigeration system operated by a compressor 12, preferably having a temperature controlled crankcase 13, is contained within a compact rigid housing 11A having a bottom portion 11B which is configured to be received in the top end of a hollow reservoir 80. The water reservoir 80, has a single water compartment 14C, a dispensing valve 19, and contains a water level sensing device 17. The reservoir 80 may also be insulated as indicated at 80A.

Conduit 21 extends upwardly from the reservoir compartment 14C through the bottom portion 11B of the housing 11A through a circulating pump 22 and a replaceable filter 23 and returns to the reservoir compartment. A pressure sensing device 24 is located in the conduit 21 at a location where the water stream will increase the circulating pressure upon a resistance in the water filter 23 and turn off the circulating pump 22 to prevent overload or damage.

An evaporator guard 81 may be removably connected by a connector 82 to the bottom portion 11B of the housing 11A which extends downwardly into the reservoir and surrounds the secondary evaporator unit and conduit 21 for protecting the evaporator and conduit units when the apparatus is opened.

Duct sections 28 and 29 are contained within the housing 11A for conducting atmospheric air through the housing. Duct section 29 contains a motorized blower or fan 56. As explained hereinafter, the fan 56 draws ambient air, represented by arrow 57 from the atmosphere through the duct 28 and the outgoing air, represented by arrow 58 is exhausted through the duct 28.

Duct section 28 contains a condenser unit 30 and an evaporator unit 39. Condenser unit 30 is connected at its intake side by conduit 31 to the compressor 12 through a pressure sensing device 32. The outlet side of the condenser unit 30 is connected by conduit 34 through expansion valve 42 to the intake of the evaporator 39. The outlet side of the evaporator unit 39 is connected by conduit 45 which extends to the return side of the compressor 12 through an accumulator 47.

A secondary evaporator unit 44 disposed in the reservoir compartment 14C and its inlet side is connected by conduit 49A to the conduit 45 between the evaporator 39 and accumulator 47. The outlet side of the secondary evaporator 44 is joined by conduit 49B to the conduit 31 between the compressor 12 and the condenser 30.

The bottom portion of the duct section 28 is tapered to collect condensation and is connected to the reservoir compartment 14C by conduit 51 which extends downwardly and joins conduit 21 below the filter 23 to extend into the compartment 14C of the reservoir 80. A replaceable filter 53 is installed at the tapered bottom portion of the duct section 28 to filter the condensation. The filter 53 may be a "snap-in" type and changed by removing an access door on the duct or housing.

A water seal 54 is installed in the conduit 51 and connected through a drain valve 54A back into the conduit 51. The water seal 54 aids in isolating the incoming environmental elements and the ambient air temperature from the reservoir 80, and may also be temperature controlled to extract or inject heat from or into the internal water content of the seal to provide a more consistent temperature in the reservoir.

As previously described and shown in FIG. 1, an air flow sensing device 55, temperature sensors 73, and level sensor 74 are located within the duct section 28. These components are not labeled with a reference numeral, because of limited space in the drawing figure, but may be seen in FIG. 1.

The duct element 28 may be insulated as represented at 59 so as to minimize the exchanging of temperature between the duct section and the incoming atmospheric air stream 57, in addition to minimizing the exchange of the temperature between the duct section and the evaporator unit 39.

An air intake ring 60 is mounted at the intake end of the duct 28 and receives a replaceable air filter 61 which is maintained thereon by a retainer ring 62. An air intake stabilizer 63 may optionally be located within the air intake ring 60 to enhance efficiency. The air intake stabilizer 63 is configured to aerodynamically pass the incoming atmospheric air stream 57 through the duct sections and provide a stable air flow rate. The air filter 61 is constructed of a suitable non-absorbent material to trap particles of dirt and/or other undesirable elements. An optional removable cap or cover 64 may be used to cover the filter 61 in hostile conditions or environments.

An exhaust ring 65 is mounted at the discharge end of the duct 29 and preferably has a plurality of lightweight louvers or shutters 66 pivotally mounted thereon which may be closed by gravity or other means conventional in the art. The shutters 66 help to keep out undesirable environmental elements when the system is in a non-operating state. An optional removable cap or cover 67 may be used to cover the exhaust ring 65 in hostile conditions or environments.

The system is powered by an electrical source and electrical current is supplied to the components by a wiring harness 68 having a plurality of electrical conductors and modular plug connectors 69 for fast economical assembly and repair.

The operation of the system is controlled by a control module 70 which may contain switches and buttons necessary for operation of the system. Control module 70 may also contain a microprocessor for assuring maximum condensation, in addition to a removable program module 71, or pre-programmed I.C. chip, which may be plugged into the control module to alter operation for specific conditions. The control module 70, may also contain an auxiliary power supply battery for retaining information in the event of electrical failure. The insertable program module 71 provides maximum operation for a specific geographical location and allows the system to immediately adapt to new environmental conditions when necessary. A diagnostic test unit may be provided which will plug into the control module 70 for trouble-shooting and repair of the system.

A humidistat 73 may be provided to maximize efficiency of atmospheric condensation throughout various times of day or night while in a manual or an automatic operating state. The humidistat 73 is monitored by the control module microprocessor and referenced with program module 71.

Figure 3:
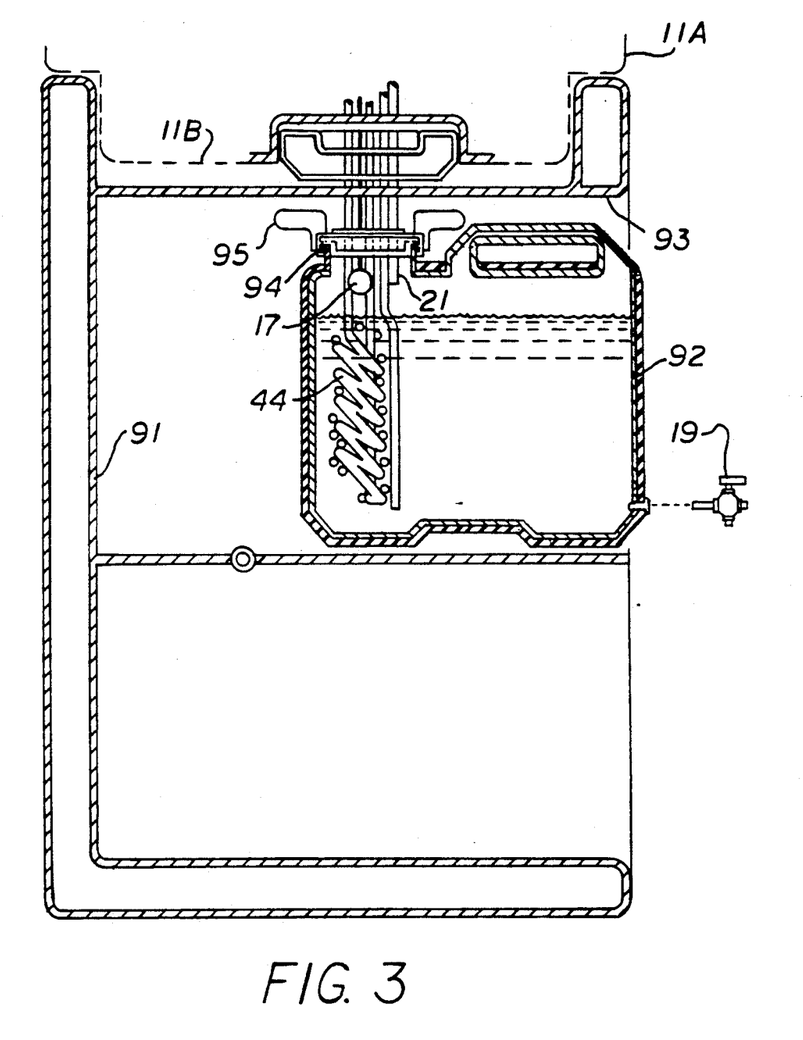
FIG. 3 is a cross sectional view of a modified reservoir arrangement utilized in combination with the embodiment of FIG. 2, the bottom portion of the upper housing being represented by dotted line.

Another modification the water extraction system 90 is shown in FIG. 3, which utilizes a stand or housing 91 which may be used in combination with the embodiment of FIG. 2. The bottom portion 11B of the upper housing 11A of the embodiment of FIG. 2 is represented by dotted line.

The embodiment of FIG. 3 utilizes a plurality of removable reservoirs or containers 92 which are removably received in an opening 93 in the housing 91. The removable containers 92 preferably have a wide mouth opening 94 through which the secondary evaporator 44 and conduit 21 is inserted. A lock ring 95 at the upper end of the opening retains the removable containers 92 during the filling operation.

The bottom wall of the opening 93 may be hinged at 96 to facilitate installing the removable containers onto the secondary evaporator 44 and conduit 21.

OPERATION

Referring to the embodiment of FIG. 1, in operation the present water collector system draws atmospheric air 57 through the air filter 61 and the duct section 28, pulling the air stream through the evaporator unit 39 where the filtered air is reduced in temperature, and exhausts the filtered and cooled air 58 through the condenser 30 in duct section 27.

A compressed refrigerant vapor is cycled through the system by the compressor 12. As the vapor is compressed to near a state of adiabatic compression, its temperature rises due to the work (energy) added to the vapor by the compressor. The heated and pressurized vapor is then contained and distributed through the system by conduit 31. The temperature may be monitored by sensors 73 on the conduit 31. The heated and pressurized vapor enters the condenser unit 30. The condenser unit 30 is positioned within the duct 27 to cause maximum heat rejection, reducing the temperature of the compressed vapor and condensing it into a high pressure liquid which is collected in the receiver 33. This high pressure liquid is then distributed from the receiver 33 through the dryer 41 through conduit 40 and held within the condenser 30 by the expansion valve 42.

While the high-pressure refrigeration liquid is being held back under pressure by expansion valve 42, the evaporator side of the valve is placed under a suction or vacuum. When the temperature of the evaporator is too high, expansion valve 42 meters the high pressure refrigeration liquid into evaporator unit 39, which is in a state of vacuum or low pressure, and causes the contained high-pressure refrigeration liquid, to boil or evaporate when suddenly introduced into the vacuum, thereby absorbing heat from the incoming atmospheric airstream 57, and transforming it into a low-pressure refrigeration liquid, and continuing the transformation into a low-pressure refrigeration vapor such that atmospheric moisture is collected in the form of potable water on evaporator unit 39. The temperature may be monitored by means of temperature sensor 73.

The low-pressure refrigeration vapor then leaves evaporator unit 39 through conduit 45 and check valve 46. The evaporator unit 39 is positioned to cause maximum recovery of atmospheric water from the air stream 57. Evaporator 39 absorbs heat from the incoming atmospheric air stream 57 lowering the air temperature below it's dew point and causing the atmospheric moisture to then collect on the surface of the evaporator element in the form of water droplets, due to condensation. The condensation on the evaporator unit 39 is then collected in the tapered lower portion of duct section 28 and distributed through replaceable filter 53 trapping particles of undesirable elements, then continues on through water seal 54, which helps to isolate the incoming environmental elements and the ambient air temperature from the reservoir 14. The level of collected water in the lower portion of duct 28 is monitored by a sensing device 74 which may be of a float type.

The water in the water seal 54 is continuously replaced by newly condensed water during normal operation. The water is then distributed through directional valve 52 which directs collected water to the appropriate reservoir compartment 14A or 14B, and when divergence is not required, collected water may be distributed directly into the reservoir. Water level sensing device 17 monitors the level of the collected water which may also be monitored by temperature sensors 73.

Water collected in the cold water compartment 14A of the reservoir 14 is maintained at a preferred cool temperature by the secondary evaporator unit 44, which when operating, may operate intermittently or simultaneously with evaporator unit 44, and may be operated continuously after the reservoir compartment has been filled. The secondary evaporator unit 44 is positioned to cause maximum heat transfer and absorption when submersed into the collected water to bring it to, and maintain, a desired temperature of the water. The rate at which heat is transferred is greatly enhanced by the direct submersion of the secondary evaporator unit. The temperature may be monitored by means of sensor 18. The high-pressure refrigerant in a liquid state contained in conduit 49 is held back under pressure by expansion valve 43 while the opposite side of the valve is place under a suction or vacuum.

When the temperature of the collected water is higher than desired, expansion valve 43 meters the high pressure refrigerant in a liquid state into the secondary evaporator unit 44, which is in a state of vacuum, and causes the high-pressure refrigeration liquid to boil or evaporate when suddenly introduced into the vacuum. Thus, heat is absorbed from the collected water and transforms the contained high-pressure refrigerant in a liquid state into a low-pressure refrigerant vapor. The low-pressure vapor is contained by check valve 50 in conduit 45, dryer 41 and accumulator 47 which traps any remaining liquid allowing further transformation into a vapor and then passes it on through conduit 45 where it is returned to compressor 12. Pressure may be monitored by pressure sensing device 48.

The collected water in warm water compartment 14B of reservoir 14 is maintained at a preferred warm temperature by means of secondary condenser unit 35, which may operate continuously and in unity with condenser unit 30, when the warming selection is being utilized, to maximize heat rejection, or simultaneously with condenser 30, maintain a balanced system. The temperature may be monitored by means of temperature sensors 18. The maximum temperature obtainable as heated water is dependent upon the type of refrigerant being used, and upon design requirements. The secondary condenser unit 35 is positioned to cause maximum heat transfer when submersed and reject heat previously absorbed into the collected water, thereby increasing the temperature of the collected water. The rate at which heat is transferred is greatly enhanced by the direct submersion of the secondary condenser unit.

The high-pressure refrigerant vapor in divergence conduit 37 is held back by means of solenoid valve 38. When the temperature of the collected water in compartment 14B is lower than preferred, valve 38 opens causing the high-pressure refrigerant vapor to flow, or to be metered through secondary condenser unit 35, where the heat is rejected into the collected water thereby transforming the contained high-pressure refrigerant vapor into a high-pressure refrigerant liquid which is then sent to receiver 33 through conduit 34 and check valve 36.

The water holding reservoir 14 thus contains heated and cooled water the respective compartments. The collected cold or warm water may then be removed through the dispensing valve 19, or if removable reservoirs are used, poured directly from reservoir. The collected water, upon accumulating in the reservoir compartments will activate the water level sensing device 17, which may be monitored by control module 70, and the water level may be observed by sight glass 20 or other suitable indicator.

The collected water may be circulated through filters 23 by the circulating pumps 22. The collected water is drawn into conduit 21, pumped through replaceable filters 23, and then returned to the reservoir. The filters 23 assists in removing any remaining undesirable particles, odors, or elements from the collected water.

Pressure sensing devices 24 located within the conduits 21 will increase the circulating pressure upon a resistance in the water filters 23 and turn off the circulating pumps 22 to prevent overload or damage. The filtering time may be selectively set from the control module 70 or it may be fixed for specific applications, including an automatic mode.

When the unit is not operational, positive drainage is assured, for sanitary reasons, by opening valve 54A, which will empty the contents of the environmental seal 54 into the reservoir compartments for further drainage through valves 26 and conduit 25, to dispose of all contents. Valve 54A may also drain the contents to a source outside of unit bypassing the reservoir compartments.

While this invention has been described fully and completely with special emphasis upon a preferred embodiment, it should be understood that within the scope of the appended claims the invention may be practiced otherwise than as specifically described herein.

We claim:

1. An apparatus for collecting potable water from a flow of moisture-laden atmospheric air comprising:

a compact housing having duct means including an air intake portion and an air exhaust portion, air filter means for filtering air entering said duct means, refrigeration means including an evaporator and condenser for a refrigerant disposed in said duct means, a compressor exterior of said duct means operatively connected to a power source and to said condensor, and an expansion valve operatively connected between said condensor and said evaporator, forced-draft means operatively connected with said duct means for conducting atmospheric air in heat exchanging relationship with said evaporator and said condenser, the refrigerant in a refrigerating cycle being compressed in said compressor and fed through said condensor where it is liquified to dissipate heat into air passing through said duct means then fed through said expansion valve and expanded then fed through said evaporator to abstract heat from air passing through said duct means, the atmospheric air being filtered by said air filter means and cooled by said evaporator to form condensation thereon and the cooled air being exhausted through said condensor, reservoir means connected with said evaporator for collecting the condensation formed thereon, isolating means disposed between said evaporator and said reservoir means for isolating the condensation collected in said reservoir from impurities and from surrounding ambient air temperature, temperature control means operatively connected with said isolating means for controlling the temperature of the condensation passing therethrough between said evaporator and said reservoir to facilitate a consistent temperature of the condensation collected in said reservoir, and water filter means disposed between said evaporator and said reservoir for filtering impurities from the condensation such that the collected condensation is potable.

2. The apparatus according to claim 1 including a second evaporator disposed in said reservoir in heat exchanging relationship with the collected condensation and operatively connected with the first said evaporator and the first said condensor, and control means disposed between said second evaporator and the first said evaporator and the first said condensor for selectively allowing the refrigerant to pass therebetween, whereby the refrigerant in a refrigerating cycle is compressed in said compressor, fed through said condensor where it is liquified to dissipate heat into air passing through said duct means, fed through said expansion valve and expanded, fed through the first said evaporator to abstract heat from air passing through said duct means, and fed through said second evaporator to abstract heat from the collected condensation in said reservoir to provide cool potable condensation.

3. The apparatus according to claim 1 including a second condensor disposed in said reservoir in heat exchanging relationship with the collected condensation and operatively connected with the first said evaporator and the first said condensor, and control means disposed between said second condensor and the first said evaporator and the first said condensor for selectively allowing the refrigerant to pass therebetween, whereby the refrigerant in a refrigerating cycle is compressed in said compressor, fed through the first said condensor where it is liquified to dissipate heat into air passing through said duct means, fed through said second condensor to dissapate heat into the collected condensation in said reservoir, fed through said expansion valve and expanded, and fed through said evaporator to abstract heat from air passing through said duct means, to provide warm potable condensation.

4. The apparatus according to claim 1 including a first and second reservoir connected with said evaporator for collecting the condensation formed thereon, a second evaporator disposed in said first reservoir in heat exchanging relationship with the collected condensation therein, a second condensor disposed in said second reservoir in heat exchanging relationship with the collected condensation therein, said second evaporator and said second condensor operatively connected with the first said evaporator and the first said condensor, and control means disposed between said second evaporator and said second condensor and the first said evaporator and said the first said condensor for selectively allowing the refrigerant to pass therebetween, whereby the refrigerant in a refrigerating cycle is compressed in said compressor, fed through the first said condensor where it is liquified to dissipate heat into air passing through said duct means, fed through said second condensor to dissapate heat into the collected condensation in said second reservoir, fed through said expansion valve and expanded, fed through the first said evaporator to abstract heat from air passing through said duct means, and fed through said second evaporator to abstract heat from the collected condensation in said reservoir to provide cool potable condensation in said first reservoir and warm potable condensation in said second reservoir.

5. The apparatus according to claim 1 in which said reservoir is removably disposed in said housing.

6. The apparatus according to claim 1 in which said reservoir is thermally insulated.

7. The apparatus according to claim 1 including water level sensing and indicating means operatively connected with said reservoir means for monitoring the level of the collected condensation.

8. The apparatus according to claim 1 including temperature sensing and indicating means operatively connected with said reservoir means for monitoring the temperature of the collected condensation.

9. The apparatus according to claim 1 including dispensing means operatively connected with said reservoir for removing the collected condensation therefrom.

10. The apparatus according to claim 1 including pump means operatively connected with said reservoir for circulating collected condensation through a conduit to and from said reservoir, and replaceable water filter means disposed in the conduit between said pump means for filtering the collected condensation.

11. The apparatus according to claim 10 including pressure sensing means disposed in the conduit between said pump means and said water filter and operatively connected to said pump means to stop circulation upon a predetermined increase in pressure.

12. The apparatus according to claim 10 including drain means in said conduit for draining water from the apparatus.

13. The apparatus according to claim 1 in which said duct means is tapered to facilitate collection of condensation from said evaporator.

14. The apparatus according to claim 1 in which said duct means is thermally insulated to facilitate efficient heat exchanging relation between said evaporator and said condensor and said duct means and the surrounding ambient air.

15. The apparatus according to claim 1 including air flow control means operatively connected with said duct means air intake portion and air exhaust portion to aerodynamically conduct the incoming atmospheric air through said duct means and provide a stable air flow rate.

16. The apparatus according to claim 1 including protective means on said duct means air intake portion and air exhaust portion to prevent undesirable elements from entering said duct means when the apparatus is not operating.

17. The apparatus according to claim 1 including replaceable modular control means including a programmed integrated circuit for selectively controlling the operation of the apparatus in accordance with predetermined conditions and to alter its operation for specific conditions.

18. The apparatus according to claim 1 including control means including memory means for controlling the operation of the apparatus in accordance with predetermined conditions, connector means coupled with said control means for connecting diagnostic equipment to the apparatus for troubleshooting and repair of the apparatus, and auxiliary power means operatively connected with said control means to continue operation of the apparatus in the event of power failure and to prevent loss of operating and collected data in said memory means.

19. The apparatus according to claim 18 including a humidistat operatively connected to said control means and monitored thereby for controlling the operation of the apparatus in accordance with predetermined conditions and to alter its operation for specific conditions as required by the humidistat.

* * * * *